Figure 1:
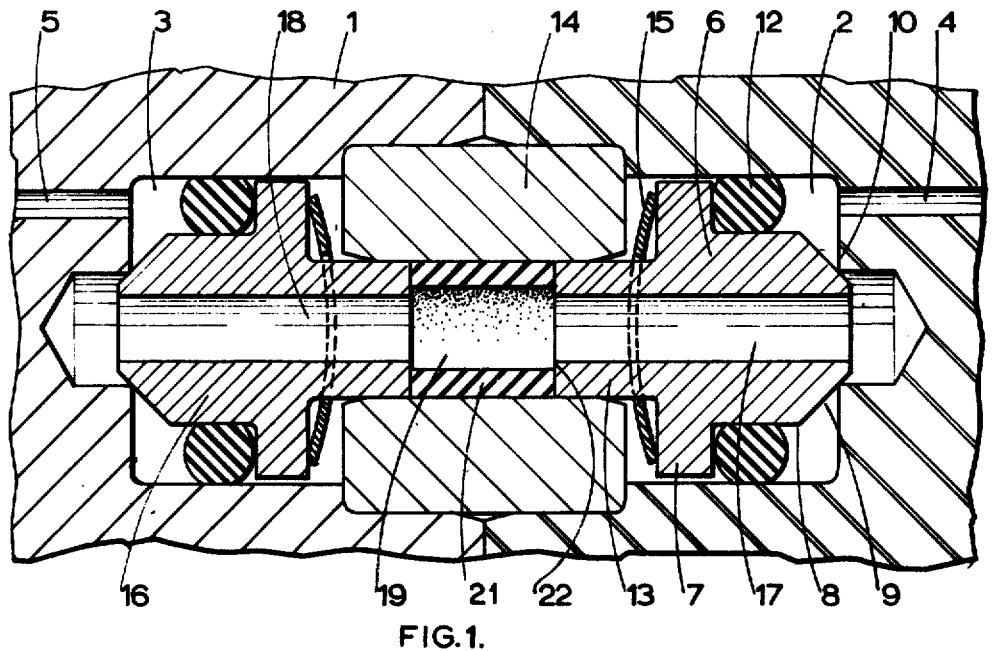

United States Patent [19]
Harrison

[11] 3,880,185
[45] Apr. 29, 1975

[54] CONTROL FOR HYDRAULIC SYSTEMS

[75] Inventor: Anthony William Harrison, Birmingham, England

[73] Assignee: Girling Limited, Birmingham, England

[22] Filed: Aug. 3, 1973

[21] Appl. No.: 385,234

[30] Foreign Application Priority Data
Aug. 22, 1972  United Kingdom............... 38974/72

[52] U.S. Cl.............. 137/493.9; 137/506; 137/112; 188/354
[51] Int. Cl.............................................. F16k 17/04
[58] Field of Search............. 137/493.9, 493.8, 493, 137/512.5, 506, 509; 303/6, 84; 188/354, 16

[56] References Cited
UNITED STATES PATENTS
| | | | |
|---|---|---|---|
| 2,934,080 | 4/1960 | Rice | 137/493.9 X |
| 3,107,681 | 10/1963 | May | 137/512.5 X |
| 3,319,653 | 5/1967 | Stephens | 137/512.5 X |
| 3,493,270 | 2/1970 | Doerfler | 137/493.9 X |

Primary Examiner—Martin P. Schwadron
Assistant Examiner—Robert J. Miller
Attorney, Agent, or Firm—Scrivener Parker Scrivener and Clarke

[57] ABSTRACT

Two related hydraulic systems in which the pressure in each system may vary are connected to ports leading into spaced chambers in a housing, and an internal passage in the housing extending between the chambers is controlled by resiliently loaded valve members each operable by pressure in one system to establish communication between said passage and the port connected to that system.

6 Claims, 2 Drawing Figures

1

CONTROL FOR HYDRAULIC SYSTEMS

This invention relates to improved control means for hydraulic systems in which the pressure in two related systems may vary.

For example, it is known practice on agricultural tractors and similar vehicles to apply the brakes on wheels on opposite sides of the vehicle by hydraulic fluid pressurised in separate master cylinders actuated by pedals which may be operated independently for steering the vehicle or simultaneously for retarding its progress. In such arrangements it is desirable to cross-connect the two hydraulic systems by means for compensating for differences in the pressures in the systems when the pedals are operated simultaneously after unequal wear of the friction surfaces of the brakes on opposite sides of the vehicle has taken place.

According to our invention a control for connection between two related hydraulic systems comprising a housing incorporating spaced chambers having ports each adapted to be connected to one of the systems, an internal passage extending between the chambers, and resiliently loaded valve members controlling communication between said passage and the ports, each valve member being operable by pressure in one system to establish communication between a port and said passage, and the opening of both valve members establishing communication by way of the passage between the ports and hence between the two systems.

By arranging the valve members in axial alignment the communicating passage can be formed at least partially in the valve members which produces a very compact unit.

Our invention is designed primarily for compensating for differences in the pressures of related hydraulic systems but it is also applicable to power systems using two valves operated by separate pedals. In such systems it is usual to arrange for the pedal-travel to be very small and in such cases the operation of compensating valves by pedal-travel would be critical, but our improved control would not be affected as it responds solely to pressure. The movement of the piston of the power control valve between the closing of the exhaust valve and the opening of the power valve should be sufficient to prevent fluid supplied by one valve from discharging via the compensating valve through the exhaust port of the other power control valve.

Figure 2:
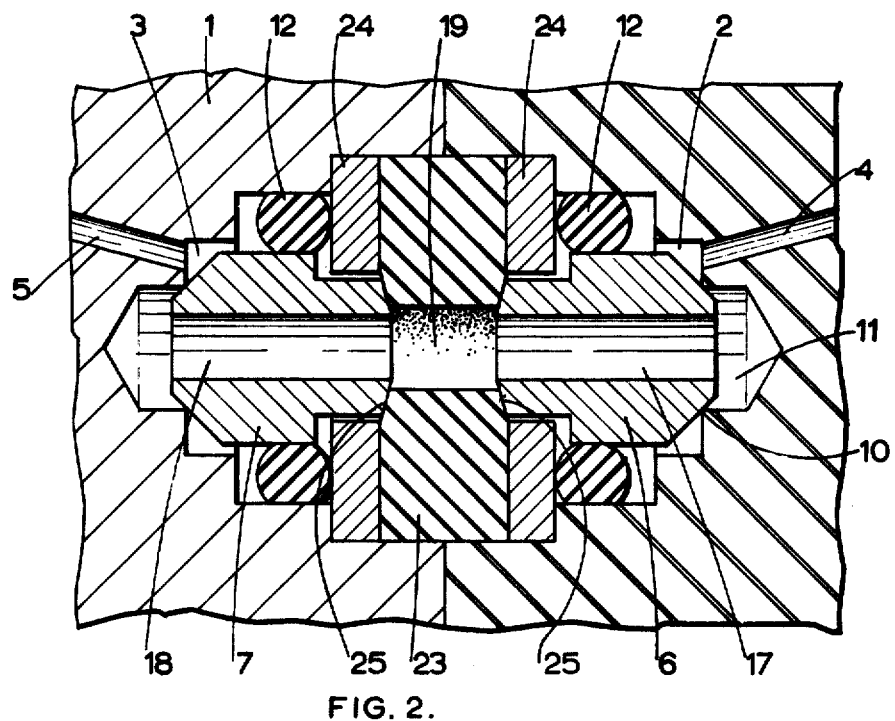

Two examples of our improved control are illustrated in the accompanying drawings in which:

FIG. 1 is a longitudinal section of one form of control suitable for use as a compensator between two hydraulic systems, and FIG. 2 is a similar longitudinal section of a modification.

In the control shown in FIG. 1 a housing 1 incorporates spaced aligned cylindrical chambers 2, 3 closed at their outer ends into which lead ports 4, 5 adapted to be connected to separate hydraulic systems. These ports are offset from the axis of the chambers.

A valve member 6 is located in the chamber 2 in which it has a limited axial movement. A central part 7 of the valve member is a sliding fit in the chamber and an axial spigot 8 extends outwardly from the part 7 and terminates in a coned face 9 adapted to engage a seating 10 around an axial recess 11 in the end wall of the chamber. An O-ring seal 12 is fitted over the spigot 8 and is in sliding and rolling contact with the peripheral wall of the chamber.

A further spigot 13 extends inwardly from the part 7 of the valve member and at its inner end is a sliding fit in an axial bore in a block 14 located centrally in the housing.

A spring washer 15 or equivalent resilient member is located on the spigot 13 and abuts between the part 7 of the valve member and the adjacent end of the block 14 to urge the valve member outwardly and normally to hold its coned outer end in engagement with the seating 10.

A valve member 16 is located in the chamber 3 and as it is identical with the valve member 6 it need not be further described.

Aligned axial bores 17, 18 are formed in and extend through both valve members and are continuous with a bore 19 in a rubber or other resiliently compressible sealing bush 21 located in the bore in the block 14 between the inner ends of the valve members which are spaced apart in an axial direction. The bores 17, 18 and 19 combine to form an axial passage extending between the seatings at the outer ends of the chambers 2, 3

Normally both valve members are in engagement with their seatings when there is no pressure in either system and there is no communication between the systems or between the systems and the axial passage.

If the system to which the port 4 is connected is pressurised the pressure acts on the outer end of the valve member 6, and if the force exerted is sufficient to overcome the loading of the spring 15 the valve member will be moved inwardly away from its seat and the port 4 will be put into communication with the axial passage.

The valve member 16 will remain closed if there is no pressure in the other system connected to the port 5.

Conversely, if there is sufficient pressure in that system the valve member 16 will open while the valve member 6 remains closed.

In that condition there is pressure in the axial passage acting on the annular part 22 of the inner end of the valve member 6 around the bore 17 which is of smaller diameter than the bore 19 in the bush 21, but there is an opposing force exerted by the same pressure acting on the part of the outer end of the valve member within the seating 10. By selection of the respective areas on which the pressure acts the opposing forces acting on the valve member can be balanced, or one can be made greater than the other according to requirements.

When both systems are pressurised both valve members will be moved inwardly away from their seatings so that the axial passage is in communication with both ports, and if the pressure in one system is higher than that of the other fluid can flow from the first system to the second.

In the modified arrangement shown in FIG. 2 the general construction is the same and the same reference numerals have been applied to corresponding parts. The main difference is that the springs 15 have been omitted and the resilient loading of the valve members is provided by a resilient sealing member 23 of the form shown in the drawing.

The outer parts of the sealing member are held between annular blocks 24 located in an annular recess in the housing. The inner ends of the valve members are coned at 25 and enter opposite ends of the axial passage 19 through the inner part of the seal which is resiliently displaced outwardly as well as being compressed axially.

The movement of the valve members can be relatively small and they can be closed by the roll-back effect of the O-ring seals as well as by the compression of the sealing member 23.

It will be appreciated that the compensating valve can be located at any convenient point on a vehicle and that it allows simple standard master cylinders to be used without critical adjustment to ensure compensation over the whole pedal-travel. Only a very small volume of fluid is trapped in the compensating valve so that the effects of differential expansion are usually negligible.

I claim:

1. A control for connection between two related hydraulic systems comprising a housing incorporating spaced chambers having ports each adapted to be connected to one of the systems, an axial bore in the housing extending between the chambers and a resiliently loaded sealed valve member axially slidable in each chamber, an axial passage through each valve member in alignment with the axial bore in the housing, and resilient means urging the outer end of the member into engagement with a seating at the outer end of the chamber to close the passage through the valve member when there is no pressure in the system to which that chamber is connected.

2. A control for connection between two related hydraulic systems in which the pressures are liable to vary, comprising a housing incorporating two aligned cylindrical chambers each having a port adapted to be connected to one of the systems, aligned valve members working in the respective chambers, an axial passage through each valve member in alignment with a co-axial passage in the housing between the chambers, a seating for the outer end of each valve member formed by a closed axial recess in the outer end of each chamber with which the outer end of the valve member is resiliently held in engagement to close the passage through the valve member when there is no pressure in the associated system, each valve member being axially movable by pressure in the associated system to open the outer end of the axial passage in the member which passage with the axial passages in the valve members jointly provide direct communication between the systems when there is pressure in both systems.

3. A control as in claim 2 wherein the inner ends of the valve members terminate in reduced spigot portions slidable in a bore in a block in the housing between the chambers, and a resiliently compressible sealing bush is located in the bore between the inner ends of the valve members, the bush having an axial passage in alignment with the axial passages in the valve members.

4. A control as in claim 3 wherein resilient means are located on the spigot portions of the valve members and abut between the respective valve members and the adjacent ends of the block.

5. A control as in claim 2 wherein O-ring seals are fitted over the outer portions of the valve members and are in sliding and rolling contact with the walls of the chambers.

6. A control as in claim 2 wherein the inner ends of the valve members are coned and enter complementary recesses at the outer ends of an axial passage through a resilient sealing member of which the outer part is located between blocks in an annular recess in the housing between the chambers, the resilience of the sealing member holding the outer ends of the valves in engagement with their seatings when there is no pressure in either system.

* * * * *